(12) United States Patent
Takamori (10) Patent No.: US 8,073,311 B2
(45) Date of Patent: Dec. 6, 2011

(54) MOVING IMAGE REPRODUCING APPARATUS

(75) Inventor: Tomotsugu Takamori, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1151 days.

(21) Appl. No.: 11/878,573

(22) Filed: Jul. 25, 2007

(65) Prior Publication Data

US 2008/0050097 A1    Feb. 28, 2008

(30) Foreign Application Priority Data

Aug. 22, 2006   (JP) .................................. 2006-225371

(51) Int. Cl.
- *H04N 5/94* (2006.01)
- *H04N 9/88* (2006.01)
- *H04N 5/765* (2006.01)
- *H04N 5/775* (2006.01)

(52) U.S. Cl. ......... 386/263; 386/200; 386/230; 386/231
(58) Field of Classification Search .......... 386/263–277, 386/200, 230–231
See application file for complete search history.

(56) References Cited

U.S. PATENT DOCUMENTS

| | | | | |
|---|---|---|---|---|
| 5,497,377 A | * | 3/1996 | Muto et al. ........... | 714/715 |
| 6,839,055 B1 | * | 1/2005 | Nguyen .................. | 345/204 |
| 7,050,060 B1 | * | 5/2006 | Ohara et al. ........... | 345/537 |
| 7,398,547 B2 | * | 7/2008 | deCarmo ................ | 726/3 |
| 7,414,619 B2 | * | 8/2008 | Kim ....................... | 345/204 |
| 2004/0240667 A1 | * | 12/2004 | Lee et al. ............... | 380/46 |
| 2005/0069130 A1 | * | 3/2005 | Kobayashi ............. | 380/201 |
| 2006/0021060 A1 | * | 1/2006 | Fujinami et al. ....... | 726/26 |
| 2006/0077778 A1 | | 4/2006 | Tatum et al. | |
| 2006/0104392 A1 | | 5/2006 | Chung | |

FOREIGN PATENT DOCUMENTS

| | | |
|---|---|---|
| EP | 1 635 562 | 3/2006 |
| JP | A 2005-109703 | 4/2005 |
| JP | 2005-184079 A | 7/2005 |
| WO | WO 2006/043547 A1 | 4/2006 |

* cited by examiner

*Primary Examiner* — Thai Tran
*Assistant Examiner* — Hung Dang
(74) *Attorney, Agent, or Firm* — Morgan, Lewis & Bockius LLP (57) ABSTRACT

A moving image reproducing apparatus that can produce appropriate information concerning the occurrence of a communication error in the DDC includes an error detecting unit that detects a communication error in a display data channel (DDC); an error information generating unit that generates error information if a communication error in the DDC is detected by the error detecting unit; and an error information output unit that delivers the error information to the display device via a transition minimized differential signaling (TMDS) channel.

15 Claims, 6 Drawing Sheets

MOVING IMAGE REPRODUCING APPARATUS

This application is based on Japanese Patent Application No. 2006-225371 filed on Aug. 22, 2006, the contents of which are hereby incorporated by reference.

BACKGROUND OF THE INVENTION

1. Field of the Invention

The present invention relates to a moving image reproducing apparatus. In particular, the present invention relates to a moving image reproducing apparatus that is connected with a display device via a high definition multimedia interface (HDMI) to communicate with the same for delivering moving images and sounds, so that moving image information and audio information recorded on a recording medium are read, reproduced and delivered to the display device.

2. Description of Related Art

As a standard for transmitting a digital picture signal, the digital visual interface (DVI) standard has become widespread. Furthermore, the HDMI standard has been adopted as a digital signal transmission standard that is an improvement of the DVI standard. The HDMI standard includes various requirement that are not included in the DVI standard, one of which is that a digital picture signal can be transmitted not only as R, G and B signals but also as color-difference (Y, Cb and Cr) signals.

For example, there is a display device that is made up of a liquid crystal display (LCD) or the like and is provided with an input terminal for the HDMI, so that a digital signal that conforms to the HDMI standard can be supplied to the input terminal from external equipment such as a DVD (Digital Versatile Disk) player.

In addition, a transmission signal of the HDMI standard includes display related information such as resolution information and sound related information such as sound effect information as extended display identification data (EDID). For example, there is proposed a DVD player that can set resolution of an image displayed on the display device in accordance with resolution information included in the EDID (see JP-A-2005-109703).

Since this DVD player can be set in accordance with the resolution information included in the EDID, convenience for its user is improved. On the other hand, data transmission that conforms to the HDMI standard is performed via a transition minimized differential signaling (TMDS) channel for transmitting moving image information and audio information, and via a display data channel (DDC) for performing EDID transmission and a high-bandwidth digital content protection (HDCP) process (i.e., an authentication process).

Therefore, if a communication error occurs in the DDC, the above-mentioned DVD player cannot obtain the EDID correctly. As a result, it cannot be set in accordance with the resolution information included in the EDID. In addition, if a communication error occurs in the DDC, the user cannot deal with the communication error appropriately because the user cannot know which type of communication error has occurred.

SUMMARY OF THE INVENTION

In view of the above described problem, it is an object of the present invention to provide a moving image reproducing apparatus that can produce appropriate information concerning the occurrence of a communication error in the DDC.

To attain the above described object, a moving image reproducing apparatus in a first aspect of the present invention that is connected with a display device via a high definition multimedia interface (HDMI) to communicate with the same so that moving image information and audio information recorded on a recording medium are read, reproduced and delivered to the display device, is characterized by a structure in that the apparatus includes: an error detecting unit that detects a communication error in a display data channel (DDC); an error information generating unit that generates error information if a communication error in the DDC is detected by the error detecting unit; and an error information output unit that delivers the error information to the display device via a transition minimized differential signaling (TMDS) channel.

A moving image reproducing apparatus in a second aspect of the present invention is characterized by a structure in that the apparatus further includes: an EDID obtaining unit that obtains extended display identification data (EDID) from the display device; and a first code generating unit that generates an error code based on a situation of occurrence of the error if a communication error in the DDC is detected by the error detecting unit while the EDID is being obtained, and the error information output unit delivers the error code to the display device via the TMDS channel in the apparatus according to the above first aspect.

A moving image reproducing apparatus in a third aspect of the present invention is characterized by a structure in that the first code generating unit detects whether or not the DDC is fixed to the low level, and generates a predetermined error code if the DDC is fixed to the low level in the apparatus according to the above second aspect.

A moving image reproducing apparatus in a fourth aspect of the present invention is characterized by a structure in that the first code generating unit detects whether or not the display device has returned acknowledge (ACK) information via the DDC, and generates a predetermined error code if the ACK information is not returned in the apparatus according to the above second or third aspect.

A moving image reproducing apparatus in a fifth aspect of the present invention is characterized by a structure in that the first code generating unit decides whether or not a check sum of the EDID that is obtained by the EDID obtaining unit from the display device is correct, and generates a predetermined error code if the check sum is not correct in the apparatus according to any one of the above second to fourth aspect.

A moving image reproducing apparatus in a sixth aspect of the present invention is characterized by a structure in that the apparatus further includes: an HDCP process unit that performs a high-bandwidth digital content protection (HDCP) process with the display device; and a second code generating unit that generates a second error code based on a situation of occurrence of the error if a communication error in the DDC is detected by the error detecting unit while the HDCP process is being performed, and the error information output unit delivers the second error code to the display device via the TMDS channel in the apparatus according to any one of the above first to fifth aspect.

A moving image reproducing apparatus in a seventh aspect of the present invention is characterized by a structure in that the second code generating unit decides whether or not key selection vector (KSV) information obtained from the display device is correct, and generates the predetermined second error code if the KSV information is not correct in the apparatus according to the above sixth aspect.

A moving image reproducing apparatus in a eighth aspect of the present invention is characterized by a structure in that the second code generating unit decides whether or not session key information obtained from the display device is correct, and generates the predetermined second error code if the session key information is not correct in the apparatus according to the above sixth or seventh aspect.

A moving image reproducing apparatus in a ninth aspect of the present invention is characterized by a structure in that the second code generating unit decides whether or not HDCP BlkCipher information obtained from the display device is correct, and generates the predetermined second error code if the HDCP BlkCipher information is not correct in the apparatus according to any one of the above sixth to eighth aspect.

A moving image reproducing apparatus in a tenth aspect of the present invention is characterized by a structure in that the apparatus further includes: a screen generating unit that generates error screen information that corresponds to the error code when at least one of the first code generating unit and the second code generating unit generates the first or the second error code; and an error display control unit that delivers the error screen information via the TMDS channel for the display device to display in the apparatus according to any one of the above sixth to ninth aspect.

A DVD player in an eleventh aspect of the present invention that is connected with a display device via a high definition multimedia interface (HDMI) to communicate with the same so that moving image information and audio information recorded on a DVD are read, reproduced and delivered to the display device, is characterized by a structure in that the DVD player includes: an error detecting unit that detects a communication error in a display data channel (DDC); an error information generating unit that generates error information that is information indicating that a communication error occurred in the DDC if a communication error is detected by the error detecting unit; an EDID obtaining unit that performs a process of obtaining extended display identification data (EDID) from the display device; a first code generating unit that generates an error code based on a situation of occurrence of the error, if a communication error in the DDC is detected by the error detecting unit while the EDID obtaining unit is obtaining the EDID; an HDCP process unit that performs a high-bandwidth digital content protection (HDCP) process with the display device; a second code generating unit that generates an error code based on a situation of occurrence of the error, if a communication error in the DDC is detected by the error detecting unit while the HDCP process unit is performing the HDCP process; an error information output unit that delivers the error information, the error code generated by the first code generating unit and the error code generated by the second code generating unit via a transition minimized differential signaling (TMDS) channel; a screen generating unit that generates error screen information corresponding to the generated error code if at least one of the first code generating unit and the second code generating unit generates the error code; and an error display control unit that delivers the error screen information generated by the screen generating unit for the display device to display via the TMDS channel, and the first code generating unit detects whether or not the DDC is fixed to the low level, and generates a predetermined error code if the DDC is fixed to the low level, it detects whether or not the display device has returned acknowledge (ACK) information via the DDC, and generates a predetermined error code if the ACK information is not returned, and it further decides whether or not a check sum of the EDID obtained by the EDID obtaining unit from the display device is correct, and generates a predetermined error code if the check sum is not correct, and the second code generating unit decides whether or not key selection vector (KSV) information obtained from the display device is correct, and generates a predetermined error code if the KSV information is not correct, it decides whether or not session key information obtained from the display device is correct, and generates a predetermined error code if the session key information is not correct, and it further decides whether or not HDCP BlkCipher information obtained from the display device is correct, and generates a predetermined error code if the HDCP BlkCipher information is not correct.

As to the moving image reproducing apparatus according to the first aspect of the present invention, when a communication error in the DDC is detected, error information that is information indicating that a communication error occurred in the DDC is delivered to the display device via the TMDS channel. Therefore, it is able to make the display device display a message or the like that indicates that a communication error occurred in the DDC. Thus, appropriate information can be produced concerning the occurrence of a communication error in the DDC.

As to the moving image reproducing apparatus according to the second aspect of the present invention, if a communication error in the DDC is detected while the EDID is being obtained from the display device, an error code is generated based on a situation of occurrence of the error and is delivered to the display device via the TMDS channel. Therefore, more appropriate information can be produced concerning the occurrence of a communication error in the DDC.

As to the moving image reproducing apparatus according to the third aspect of the present invention, if the DDC is fixed to the Low level, a predetermined error code is generated and is delivered to the display device via the TMDS channel. Therefore, more appropriate information can be produced concerning the occurrence of a communication error in the DDC.

As to the moving image reproducing apparatus according to the fourth aspect of the present invention, if the display device has not return ACK information via the DDC, a predetermined error code is generated and is delivered to the display device via the TMDS channel. Therefore, more appropriate information can be produced concerning the occurrence of a communication error in the DDC.

As to the moving image reproducing apparatus according to the fifth aspect of the present invention, if the check sum of the EDID obtained from the display device is not correct, a predetermined error code is generated and is delivered to the display device via the TMDS channel. Therefore, more appropriate information can be produced concerning the occurrence of a communication error in the DDC.

As to the moving image reproducing apparatus according to the sixth aspect of the present invention, if a communication error in the DDC is detected while the HDCP process is being performed, an error code is generated based on a situation of occurrence of the error and is delivered to the display device via the TMDS channel. Therefore, more appropriate information can be produced concerning the occurrence of a communication error in the DDC.

As to the moving image reproducing apparatus according to the seventh aspect of the present invention, if the KSV information obtained from the display device is not correct, a predetermined error code is generated and delivered to the display device via the TMDS channel. Therefore, more appropriate information can be produced concerning the occurrence of a communication error in the DDC.

As to the moving image reproducing apparatus according to the eighth aspect of the present invention, if the session key information obtained from the display device is not correct, a predetermined error code is generated and delivered to the display device via the TMDS channel. Therefore, more appropriate information can be produced concerning the occurrence of a communication error in the DDC.

As to the moving image reproducing apparatus according to the ninth aspect of the present invention, if the HDCP BlkCipher information obtained from the display device is not correct, a predetermined error code is generated and delivered to the display device via the TMDS channel. Therefore, more appropriate information can be produced concerning the occurrence of a communication error in the DDC.

As to the moving image reproducing apparatus according to the tenth aspect of the present invention, when the error code is generated, the error screen information corresponding to the generated error code is generated and the generated error screen information is delivered for the display device to display via the TMDS channel. Therefore, more appropriate information can be produced concerning the occurrence of a communication error in the DDC.

As to the moving image reproducing apparatus according to an eleventh aspect of the present invention, if a communication error in the DDC is detected in the DVD player, the error information that is information indicating that the communication error occurred in the DDC is delivered to the display device via the TMDS channel. Therefore, it is able, for example, to make the display device display a message or the like indicating that a communication error occurred in the DDC. Thus, appropriate information can be produced concerning the occurrence of a communication error in the DDC.

In addition, if a communication error in the DDC is detected while the EDID is being obtained from the display device, an error code is generated based on a situation of occurrence of the error, and the generated error code is delivered to the display device via the TMDS channel. Therefore, more appropriate information can be produced concerning the occurrence of a communication error in the DDC.

Further, if the DDC is fixed to the low level, a predetermined error code is generated, and the generated error code is delivered to the display device via the TMDS channel. Therefore, more appropriate information can be produced concerning the occurrence of a communication error in the DDC.

In addition, if the display device has not returned ACK information via the DDC, a predetermined error code is generated, and the generated error code is delivered to the display device via the TMDS channel. Therefore, more appropriate information can be produced concerning the occurrence of a communication error in the DDC.

Moreover, if the check sum of the EDID obtained from the display device is not correct, a predetermined error code is generated, and the generated error code is delivered to the display device via the TMDS channel. Therefore, more appropriate information can be produced concerning the occurrence of a communication error in the DDC.

Further, if a communication error in the DDC is detected while the HDCP process is being performed, an error code is generated based on a situation of occurrence of the error, and the generated error code is delivered to the display device via the TMDS channel. Therefore, more appropriate information can be produced concerning the occurrence of a communication error in the DDC.

In addition, if the KSV information obtained from the display device is not correct, a predetermined error code is generated, and the generated error code is delivered via the TMDS channel to the display device. Therefore, more appropriate information can be produced concerning the occurrence of a communication error in the DDC.

Moreover, if the session key information obtained from the display device is not correct, a predetermined error code is generated, and the generated error code is delivered via the TMDS channel to the display device. Therefore, more appropriate information can be produced concerning the occurrence of a communication error in the DDC.

Further, if the HDCP BlkCipher information obtained from the display device is not correct, a predetermined error code is generated, and the generated error code is delivered via the TMDS channel to the display device. Therefore, more appropriate information can be produced concerning the occurrence of a communication error in the DDC.

In addition, when the error code is generated, error screen information corresponding to the generated error code is generated, and the generated error screen information is delivered for the display device to display via the TMDS channel. Therefore, more appropriate information can be produced concerning the occurrence of a communication error in the DDC.

DETAILED DESCRIPTION OF THE PREFERRED EMBODIMENTS

Figure 1:
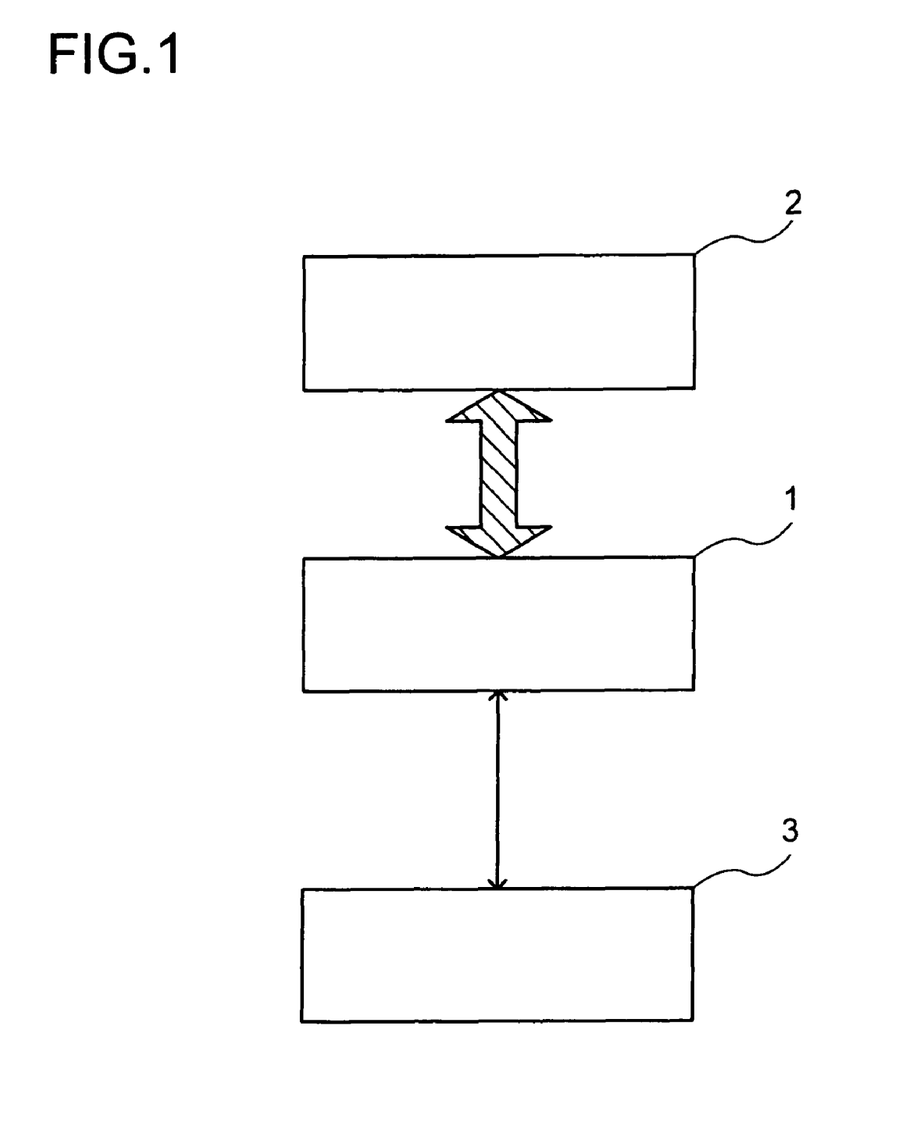
FIG. 1 is a structural diagram to show an example of a DVD player in a connected state as an example of a moving image reproducing apparatus according to the present invention.

Hereinafter, a preferred embodiment of the present invention will be described with reference to the attached drawings. FIG. 1 is a structural diagram to show an example of a DVD player in a connected state as an example of a moving image reproducing apparatus according to the present invention. The DVD player 1 (corresponding to the moving image reproducing apparatus) is connected to a remote controller 2 via infrared communication so as to communicate with the same. It is also connected to a display device 3 via an HDMI cable (i.e., using the HDMI standard) so as to communicate with the same. In addition, the DVD player 1 receives operational inputs from a user via the remote controller 2, and it reads and reproduces moving image information and audio information recorded on a DVD-RAM 100 (corresponding to a recording medium), which are delivered to the display device 3 via the HDMI cable.

The remote controller 2 receives an operational input from the user and generates an infrared signal corresponding to the operational input, which is delivered to the DVD player 1.

The display device 3, which has a speaker, displays a moving image and produces a sound based on the moving image information and the audio information that are supplied from the DVD player 1 via the HDMI cable.

Figure 2:
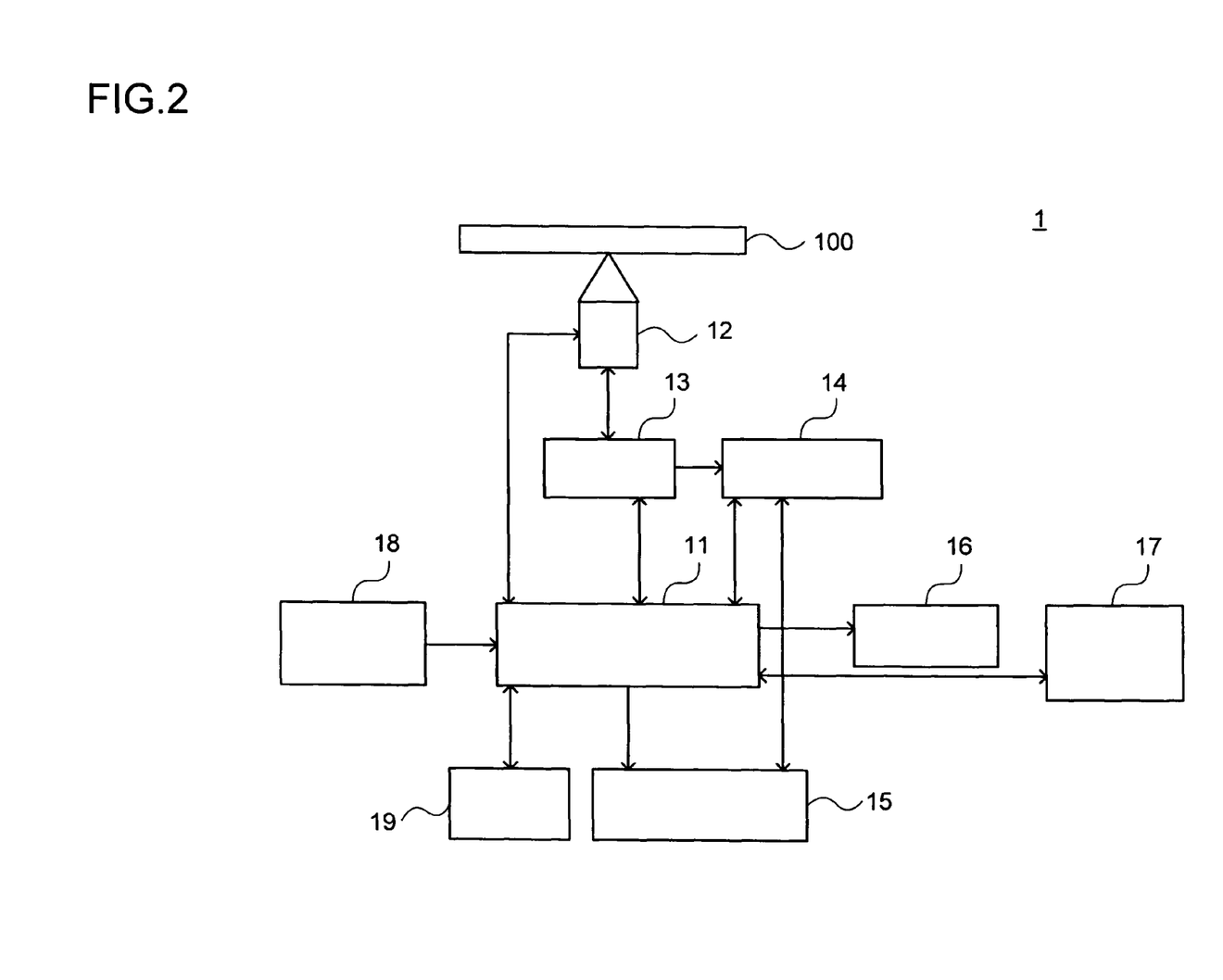
FIG. 2 is a block diagram to show a structure of the DVD player shown in FIG. 1.

FIG. 2 is a block diagram to show a structure of the DVD player 1 shown in FIG. 1. The DVD player 1 is equipped with a microprocessor 11, an optical pickup 12, an RF circuit 13, an external interface 14, an HDMI interface 15, a display unit 16, a memory 17, an infrared signal reception unit 18 and an operational unit 19.

The microprocessor 11 controls the entire operation of the DVD player 1. Here, it receives an operational signal from the remote controller 2 via the infrared signal reception unit 18 shown in FIG. 2 and generates command information corresponding to the received operational signal, which is transmitted to the display device 3 via the HDMI cable.

The optical pickup 12 projects a laser beam onto the DVD-RAM 100 for reading out data. The RF circuit 13 processes a radio frequency (RF) signal that is delivered from the optical pickup 12. The external interface 14 performs conversion or the like of a data format when input and output of data is performed with an external input and output apparatus. The HDMI interface 15 performs transmission and reception of information such as moving image information and audio information with the display device 3 via the HDMI cable in accordance with the HDMI standard.

The display unit 16, which is made up of an LCD or the like for example, displays various information such as guidance information, message information and setting information so that they can be recognized externally. The memory 17 stores, in this case, setting information of the display device 3 concerning the HDMI, which is included in the EDID obtained from the display device 3. The infrared signal reception unit 18 receives the infrared signal transmitted from the remote controller 2. The operational unit 19 includes various operational buttons and receives operational input from the outside via the operational buttons.

Figure 3:
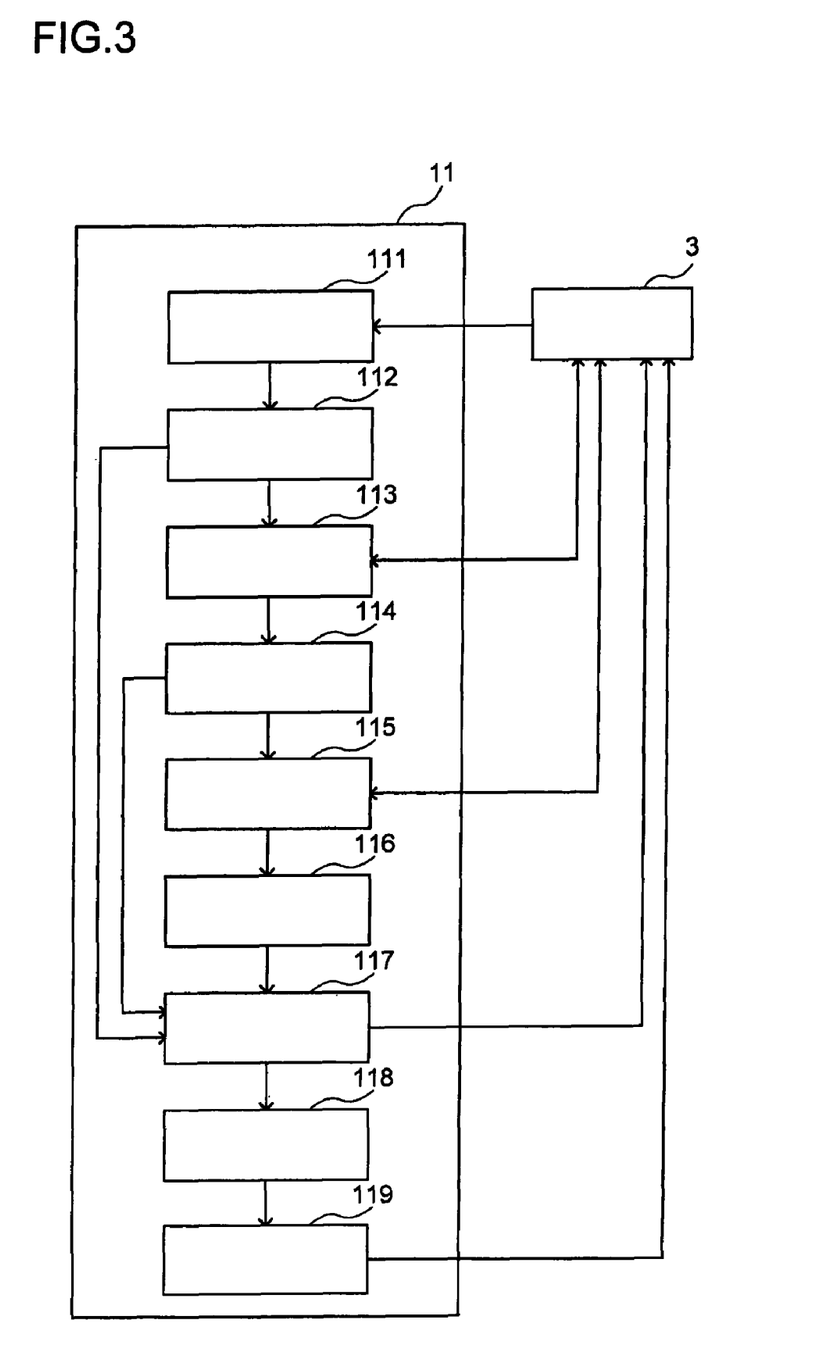
FIG. 3 is a block diagram to show an example of a functional structure of a main part of the moving image reproducing apparatus according to the present invention.

FIG. 3 is a block diagram to show an example of a functional structure of a main part of the moving image reproducing apparatus according to the present invention. The microprocessor 11 shown in FIG. 3 has functional units including an error detecting unit 111, an error information generating unit 112, an EDID obtaining unit 113, a first code generating unit 114, an HDCP process unit 115, a second code generating unit 116, an error information output unit 117, a screen generating unit 118 and an error display control unit 119.

Here, the microprocessor 11 reads out a program stored in a read only memory (ROM, not shown) or the like and executes the program, so as to work as the functional units such as the error detecting unit 111, the error information generating unit 112, the EDID obtaining unit 113, the first code generating unit 114, the HDCP process unit 115, the second code generating unit 116, the error information output unit 117, the screen generating unit 118 and the error display control unit 119.

In addition, among various data stored in the memory 17 shown in FIG. 2 or in the ROM (not shown), data that can be recorded on a removable recording medium may be read out by a driver of a hard disk drive, an optical disc drive, a flexible disk drive, a silicon disc drive, a cassette medium reader or the like, for example. In these cases, the recording medium can be a hard disk, an optical disc, a flexible disk, a compact disc (CD), a DVD, a semiconductor memory or the like, for example.

The error detecting unit 111 detects a communication error in the DDC.

The error information generating unit 112 generates error information that is information indicating that a communication error occurred in the DDC if the error detecting unit 111 detected a communication error in the DDC.

The EDID obtaining unit 113 performs a process for obtaining the EDID from the display device 3.

The first code generating unit 114 generates a first error code based on a situation of occurrence of the error if the error detecting unit 111 detected a communication error in the DDC while the EDID obtaining unit 113 is obtaining the EDID from the display device 3.

More specifically, the first code generating unit 114 detects whether or not the DDC is fixed to the low level and generates a predetermined first error code (for example, an error code "02") if the DDC is fixed to the low level. In addition, the first code generating unit 114 detects whether or not the display device 3 has returned acknowledge information (hereinafter referred to as "ACK information") via the DDC and generates a predetermined first error code (for example, an error code "01") if the ACK information is not returned. Furthermore, the first code generating unit 114 decides whether or not a check sum of the EDID obtained by the EDID obtaining unit 113 from the display device 3 is correct and generates a predetermined first error code (for example, an error code "03") if the check sum is not correct.

The HDCP process unit 115 performs an HDCP process (so-called authentication process) with the display device. Here, the HDCP process will be described based on "Japan Patent Office Standard Technologies, Information Security Technology on Clients B-2 Authentication and Identification/Authentication".

The second code generating unit 116 generates a second error code based on a situation of occurrence of the error, if the error detecting unit 111 detects a communication error in the DDC while the HDCP process unit 115 is performing the HDCP process.

More specifically, the second code generating unit 116 decides whether or not key selection vector (KSV) information obtained from the display device 3 is correct and generates a predetermined second error code (for example, an error code "05") if the KSV information is not correct. In addition, the second code generating unit 116 decides whether or not session key information obtained from the display device 3 is correct and generates a predetermined second error code (for example, error code "06") if the session key information is not correct. Furthermore, the second code generating unit 116 decides whether or not an HDCP block cipher information (hereinafter referred to as "HDCP BlkCipher information") obtained from the display device 3 is correct and generates a predetermined second error code (for example, error code "06") if the HDCP BlkCipher information is not correct.

The error information output unit 117 delivers the error information generated by the error information generating unit 112, the first error code generated by the first code generating unit 114, and the second error code generated by the second code generating unit 116 (hereinafter, these error codes are referred to simply as an "error code" in a generic manner) to the display device 3 via a transition minimized differential signaling (TMDS) channel.

The screen generating unit 118 generates error screen information corresponding to the generated error code when at least one of the first code generating unit 114 and the second code generating unit 116 generated the error code.

The error display control unit 119 delivers the error screen information generated by the screen generating unit 118 for the display device 3 to display via the TMDS channel.

Figure 4:
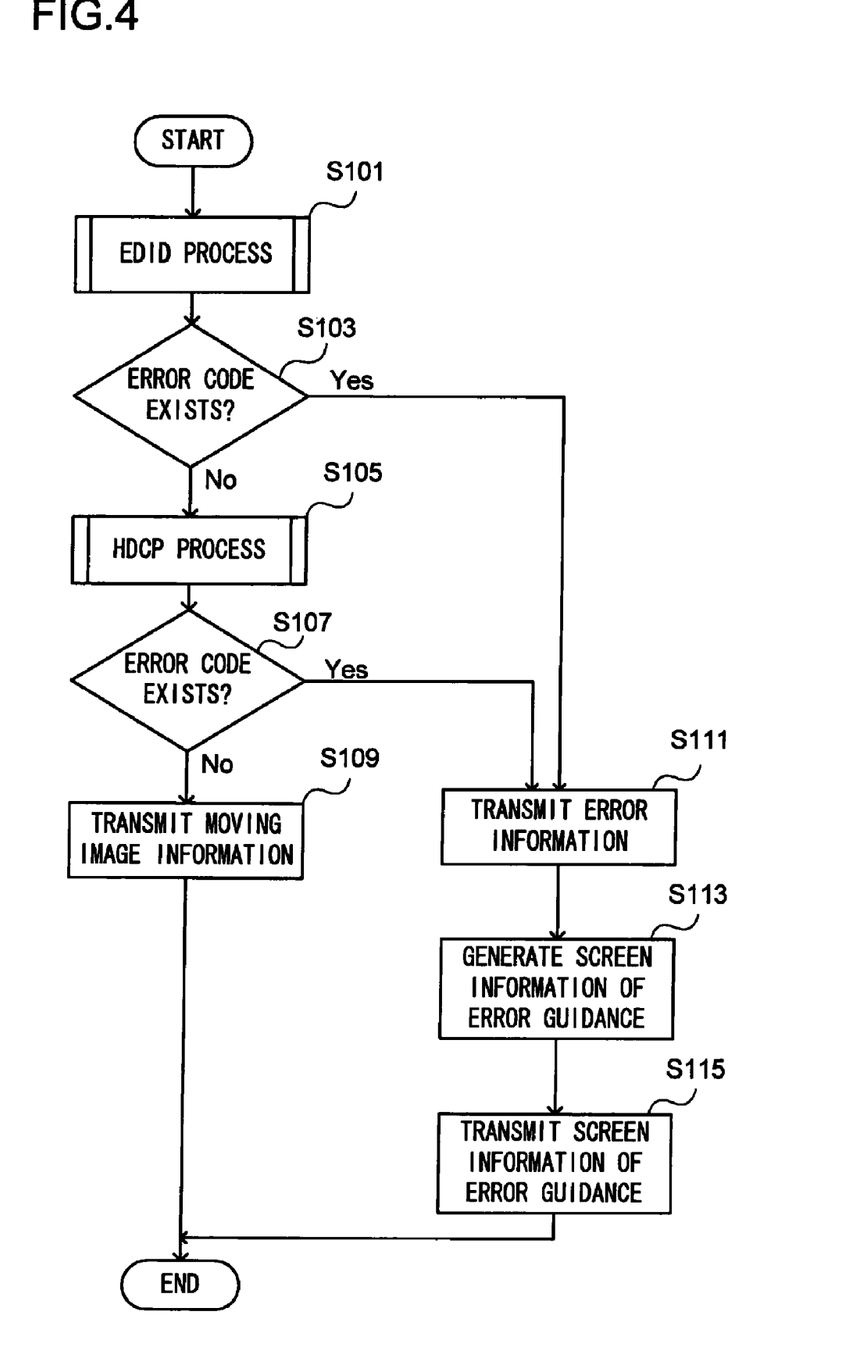
FIG. 4 is a flowchart to show an example of an operation of a microprocessor according to the present invention.

FIG. 4 is a flowchart to show an example of an operation of the microprocessor 11 according to the present invention. First, the EDID obtaining unit 113 performs a process for obtaining the EDID from the display device 3 (hereinafter referred to as an EDID process) (S101). Then, the error information output unit 117 decides whether or not an error code is generated in the EDID process of the step S101 (S103). If it is decided that the error code is generated (YES in S103), the process goes to the step S111. If it is decided that the error code is not generated (NO in S103), the HDCP process unit 115 performs the HDCP process with the display device (S105). Then, the error information output unit 117 decides whether or not an error code is generated in the HDCP process of the step S105 (S107).

If it is decided that the error code is generated (YES in S107), the process goes to the step S111. If it is decided that the error code is not generated (NO in S107), the moving image information and the audio information are transmitted to the display device 3 (S109), and the process is finished. In the case of YES in the step S103 or YES in the step 107, the error information generating unit 112 generates error information, and the generated error information, the error code generated in the step S101 and the error code generated in the step S105 are delivered to the display device 3 by the error information output unit 117 via the TMDS channel (S111). Then, the screen generating unit 118 generates error screen information corresponding to the error code generated in the step S101 and the error code generated in the step S105 (S113). Next, the error display control unit 119 delivers the error screen information generated in the step 113 for the display device 3 to display via the TMDS channel (S115), and the process is finished.

Figure 5:
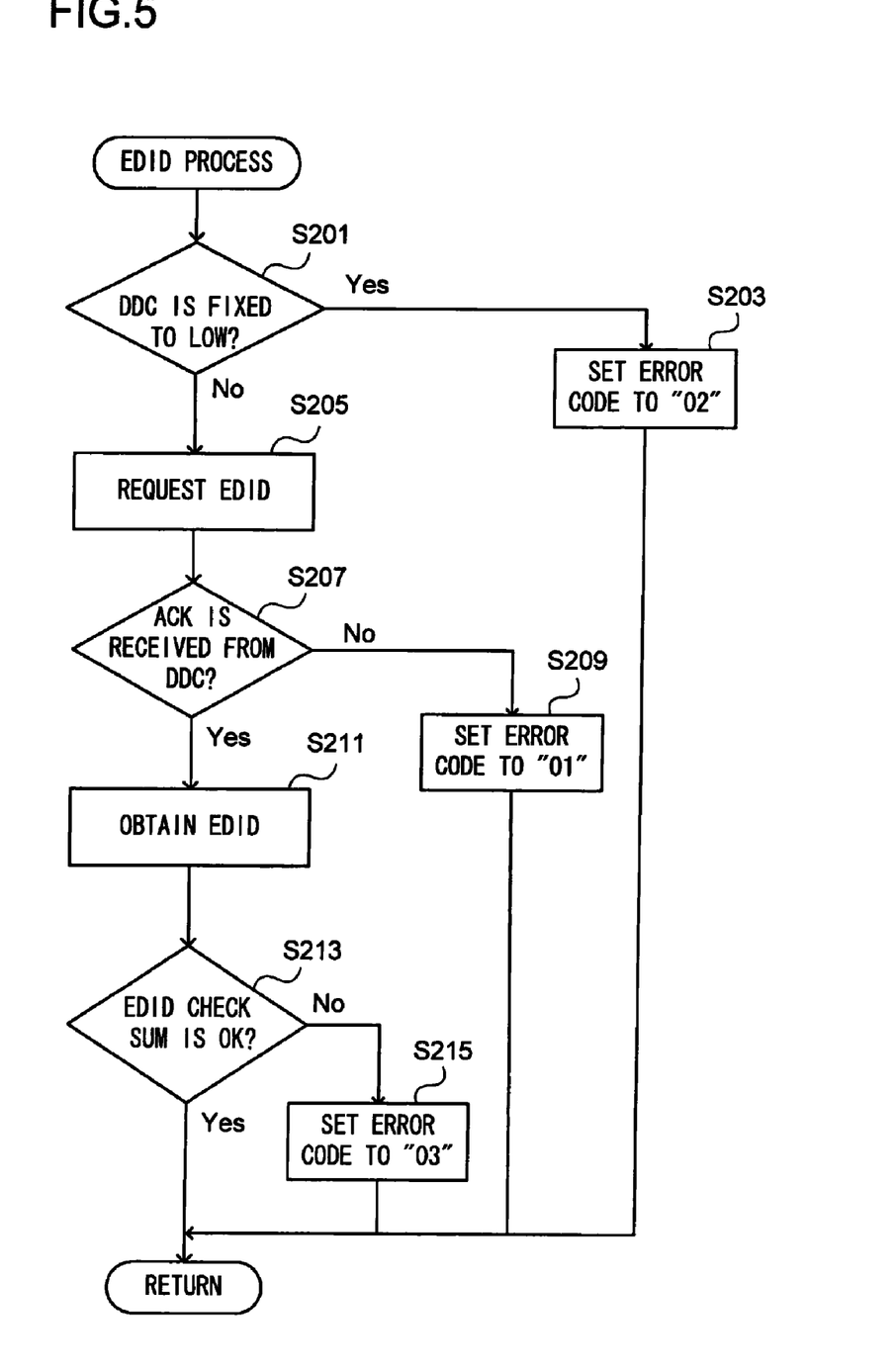
FIG. 5 is a flowchart to show an example of an EDID process that is performed in the step S101 of the flowchart shown in FIG. 4.

FIG. 5 is a flowchart to show an example of the EDID process performed in the step S101 of the flowchart shown in FIG. 4. First, the first code generating unit 114 decides whether or not the DDC is fixed to the low level (S201). If it is decided that the DDC is fixed to the low level (YES in S201), the first code generating unit 114 sets the error code to "02" (S203), and the process is returned. If it is decided that the DDC is not fixed to the low level (NO in S201), the EDID obtaining unit 113 transmits a request for obtaining the EDID to the display device 3 (S205).

Then, the first code generating unit 114 decides whether or not the ACK information is received from the display device 3 via the DDC (S207). If it is decided that the ACK information is not received (NO in S207), the first code generating unit 114 sets the error code to "01" (S209), and the process is returned. If it is decided that the ACK information is received (YES in S207), the EDID obtaining unit 113 obtains the EDID from the display device 3 (S211). Then, the first code generating unit 114 decides whether or not a check sum of the EDID is correct (S213). If it is decided that the check sum is not correct (NO in S213), the first code generating unit 114 sets the error code to "03" (S215), and the process is returned. If it is decided that the check sum is correct (YES in S213), the process is returned.

Figure 6:
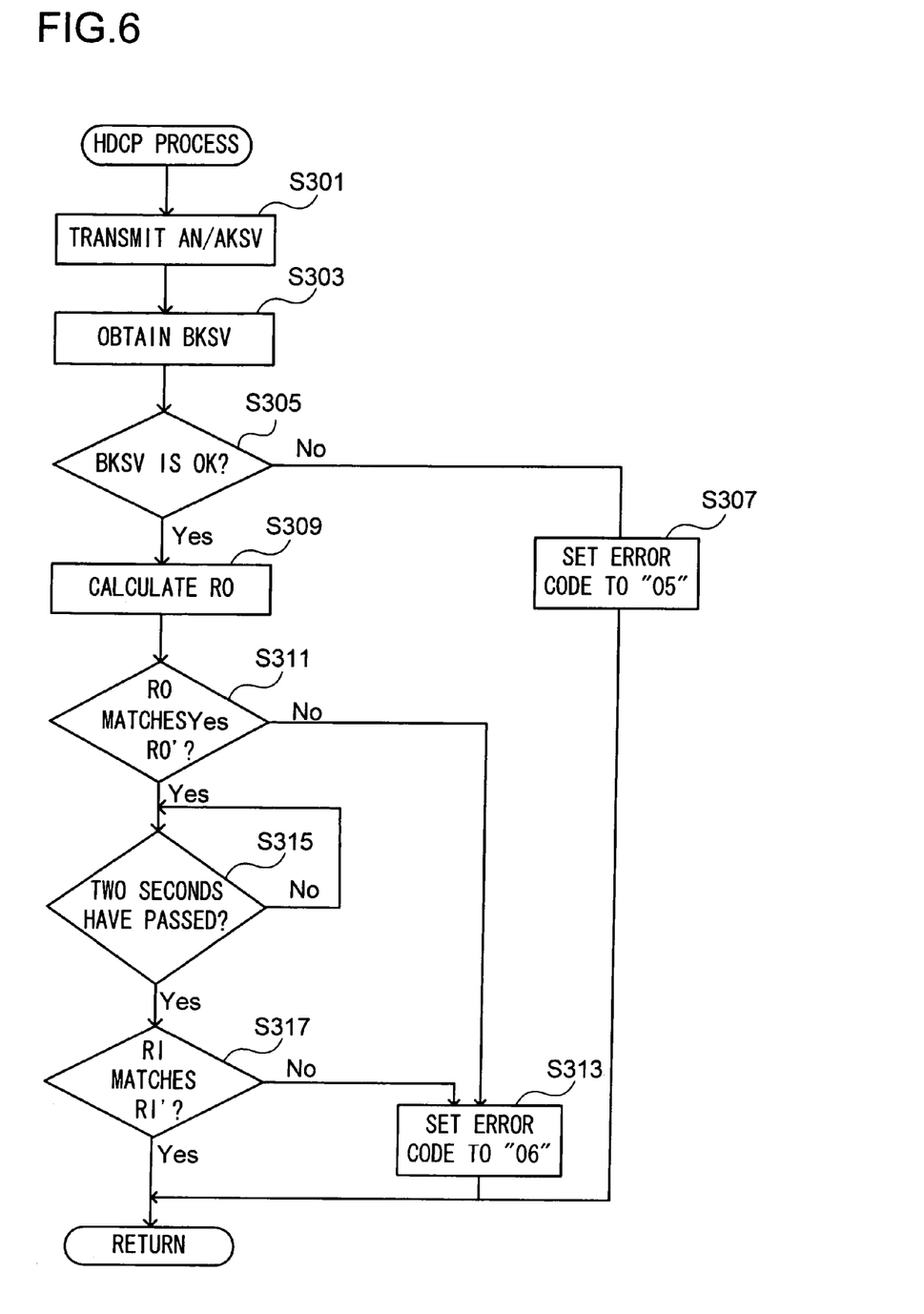
FIG. 6 is a flowchart to show an example of an HDCP process that is performed in the step S105 of the flowchart shown in FIG. 4.

FIG. 6 is a flowchart to show an example of the HDCP process that is performed in the step S105 of the flowchart shown in FIG. 4. First, the HDCP process unit 115 transmits the KSV information to the display device 3 (S301). Hereinafter, the KSV information to the display device is referred to as AKSV. Then, the HDCP process unit 115 receives the KSV information from the display device 3 (S303). Hereinafter, the KSV information from the display device is referred to as BKSV. Next, the second code generating unit 116 decides whether or not the BKSV received in the step 303 is correct (S305).

If it is decided that the BKSV is not correct (NO in S305), the second code generating unit 116 sets the error code to "05" (S307), and the process is returned. If it is decided that the BKSV is correct (YES in S305), the HDCP process unit 115 calculates and generates session key information (hereinafter referred to as R0 information), and R0' information that is information corresponding to the R0 information is obtained from the display device 3 (S309). Then, the second code generating unit 116 decides whether or not the R0 information generated in the step 309 is correct (i.e., whether or not the R0 information matches the R0' information obtained from the display device 3) (S311).

If it is decided that the R0 information does not match the R0' information (NO in S311), the second code generating unit 116 sets the error code to "06" (S313), the process is returned. If it is decided that the R0 information matches the R0' information (YES in S311), the HDCP process unit 115 decides whether or not a predetermined time (for example, two seconds) has passed (S315). If it is decided that two seconds has not passed yet (NO in S315), the process becomes a waiting state until two seconds has passed.

If it is decided that two seconds has passed (YES in S315), the HDCP process unit 115 generates the HDCP BlkCipher information (hereinafter referred to as Ri information), and Ri' information corresponding to the Ri information is obtained from the display device 3. Then, the second code generating unit 116 decides whether or not the Ri information is correct (i.e., whether or not the Ri information matches the Ri' information obtained from the display device 3) (S317). If it is decided that the Ri information does not match the Ri' information (NO in S317), the second code generating unit 116 sets the error code to "06" (S313), and the process is returned. If it is decided that the Ri information matches the Ri' information (YES in S317), the process is returned.

In this way, if a communication error in the DDC is detected, the error information that is information indicating that the communication error in the DDC has occurred is delivered to the display device 3 via the TMDS channel. Therefore, it is able to make the display device 3 to display a message or the like indicating that a communication error in the DDC has occurred, for example. Thus, appropriate information can be produced concerning the occurrence of a communication error in the DDC.

Moreover, if a communication error in the DDC is detected while the EDID is being obtained from the display device 3, the error code is generated based on a situation of occurrence of the error, and the generated error code is delivered to display device 3 via the TMDS channel. Therefore, more appropriate information can be produced concerning the occurrence of a communication error in the DDC.

Further, if the DDC is fixed to the low level, a predetermined error code (here, "02") is generated, and the generated error code is delivered to the display device 3 via the TMDS channel. Therefore, more appropriate information can be produced concerning the occurrence of a communication error in the DDC.

In addition, if the ACK information is not returned from the display device 3 via the DDC, a predetermined error code (here, "01") is generated, and the generated error code is delivered to the display device 3 via the TMDS channel. Therefore, more appropriate information can be produced concerning the occurrence of a communication error in the DDC.

Moreover, if the check sum of the EDID obtained from the display device 3 is not correct, a predetermined error code (here, "03") is generated, and the generated error code is delivered to the display device 3 via the TMDS channel. Therefore, more appropriate information can be produced concerning the occurrence of a communication error in the DDC.

Further, if a communication error in the DDC is detected while the HDCP process is being performed, the error code is generated based on a situation of occurrence of the error, and the generated error code is delivered to the display device 3 via the TMDS channel. Therefore, more appropriate information can be produced concerning the occurrence of a communication error in the DDC.

In addition, if the KSV information (i.e., the BKSV) obtained from the display device 3 is not correct, a predetermined error code (here, "05") is generated, and the generated error code is delivered to the display device 3 via the TMDS channel. Therefore, more appropriate information can be produced concerning the occurrence of a communication error in the DDC.

Moreover, if the session key information (i.e., R0' information) obtained from the display device 3 is not correct, a predetermined error code (here, "06") is generated, and the generated error code is delivered to the display device 3 via the TMDS channel. Therefore, more appropriate information can be produced concerning the occurrence of a communication error in the DDC.

Further, if the HDCP BlkCipher information (i.e., Ri' information) obtained from the display device 3 is not correct, a predetermined error code (here, "06") is generated, and the generated error code is delivered to the display device 3 via the TMDS channel. Therefore, more appropriate information can be produced concerning the occurrence of a communication error in the DDC.

In addition, when the error code is generated, error screen information corresponding to the generated error code is generated, and the generated error screen information is delivered for the display device 3 to display via the TMDS channel. Therefore, more appropriate information can be produced concerning the occurrence of a communication error in the DDC.

Furthermore, the present invention can be applied to the following structures.

(A) Although the present embodiment described above is the case where the moving image reproducing apparatus is the DVD player 1, it can be other apparatus that can be connected to communicate with a display device 3 or the like that can display a moving image and produce a sound via the HDMI and has a structure in which information stored in a recording medium such as the DVD-RAM 100 can be read out and reproduced. For example, the moving image reproducing apparatus can be a video cassette player, a personal computer or the like.

(B) Although the present embodiment described above is the case where the display device 3 is used, it is possible to use other device that can display a moving image and produce a sound and can be connected to communicate with the moving image reproducing apparatus such as the DVD player 1 via the HDMI. For example, the display device can be structured in such a way to receive television broadcasting.

(C) Although the present embodiment described above is the case where the first code generating unit 114 performs detection whether or not the DDC is fixed to the low level and other detection, the first code generating unit 114 may further detect whether or not contents of the EDID obtained from the display device 3 includes an error. In this case, the first code generating unit 114 preferably generates a predetermined error code (for example, an error code "04") if contents of the EDID include an error.

What is claimed is:

1. A moving image reproducing apparatus that is connected with a display device via a high definition multimedia interface (HDMI) to communicate with the same so that moving image information and audio information recorded on a recording medium are read, reproduced and delivered to the display device, the apparatus comprising:

an error detecting unit that detects a communication error in a display data channel (DDC);

an error information generating unit that generates error information indicating that the communication error occurred in the DDC if the communication error in the DDC is detected by the error detecting unit;

an extended display identification data (EDID) obtaining unit that obtains EDID from the display device;

a first code generating unit that generates a first error code if the communication error in the DDC is detected by the error detecting unit while the EDID is being obtained by the EDID obtaining unit;

an error information output unit that delivers the error information and information on the first error code generated by the first code generating unit to the display device via a transition minimized differential signaling (TMDS) channel;

a screen generating unit that generates, for each first error code generated by the first code generating unit, error screen information corresponding to that each first error code; and an error display control unit that delivers the error screen information via the TMDS channel for the display device to display.

2. The moving image reproducing apparatus according to 1, wherein the first code generating unit detects whether or not the DDC is fixed to a low level, and generates a predetermined first error code if the DDC is fixed to the low level.

3. The moving image reproducing apparatus according to claim 2, wherein the first code generating unit detects whether or not the display device has returned acknowledge (ACK) information via the DDC, and generates a predetermined first error code if the ACK information is not returned.

4. The moving image reproducing apparatus according to claim 2, wherein the first code generating unit detects whether or not a check sum of the EDID obtained by the EDID obtaining unit from the display device is correct and generates a predetermined first error code if the check sum is not correct.

5. The moving image reproducing apparatus according to claim 2, further comprising:

an HDCP process unit that performs a high-bandwidth digital content protection (HDCP) process with the display device; and a second code generating unit that generates a second error code if the communication error in the DDC is detected by the error detecting unit while the HDCP process is being performed, wherein the error information output unit delivers information on the second error code generated by the second code generating unit to the display device via the TMDS channel.

6. The moving image reproducing apparatus according to claim 3, further comprising:

an HDCP process unit that performs a high-bandwidth digital content protection (HDCP) process with the display device; and a second code generating unit that generates a second error code if the communication error in the DDC is detected by the error detecting unit while the HDCP process is being performed, wherein the error information output unit delivers information on the second error code generated by the second code generating unit to the display device via the TMDS channel.

7. The moving image reproducing apparatus according to 1, wherein the first code generating unit detects whether or not the display device has returned acknowledge (ACK)

information via the DDC, and generates a predetermined first error code if the ACK information is not returned.

8. The moving image reproducing apparatus according to claim 7, wherein the first code generating unit detects whether or not a check sum of the EDID obtained by the EDID obtaining unit from the display device is correct and generates a predetermined first error code if the check sum is not correct.

9. The moving image reproducing apparatus according to claim 7, further comprising:
   an HDCP process unit that performs a high-bandwidth digital content protection (HDCP) process with the display device; and
   a second code generating unit that generates a second error code if the communication error in the DDC is detected by the error detecting unit while the HDCP process is being performed, wherein
   the error information output unit delivers information on the second error code generated by the second code generating unit to the display device via the TMDS channel.

10. The moving image reproducing apparatus according to 1, wherein the first code generating unit decides whether or not a check sum of the EDID that is obtained by the EDID obtaining unit from the display device is correct, and generates a predetermined first error code if the check sum is not correct.

11. The moving image reproducing apparatus according to claim 1, further comprising:
   an HDCP process unit that performs a high-bandwidth digital content protection (HDCP) process with the display device; and
   a second code generating unit that generates a second error code if the communication error in the DDC is detected by the error detecting unit while the HDCP process is being performed, wherein
   the error information output unit delivers information on the second error code generated by the second code generating unit to the display device via the TMDS channel.

12. The moving image reproducing apparatus according to claim 11, wherein the second code generating unit decides whether or not key selection vector (KSV) information obtained from the display device is correct, and generates a predetermined second error code if the KSV information is not correct.

13. The moving image reproducing apparatus according to claim 11, wherein the second code generating unit decides whether or not session key information obtained from the display device is correct, and generates a predetermined second error code if the session key information is not correct.

14. The moving image reproducing apparatus according to claim 11, wherein the second code generating unit decides whether or not HDCP BlkCipher information obtained from the display device is correct, and generates a predetermined second error code if the HDCP BlkCipher information is not correct.

15. A DVD player that is connected with a display device via a high definition multimedia interface (HDMI) to communicate with the same so that moving image information and audio information recorded on a DVD are read, reproduced and delivered to the display device, the DVD player comprising:

an error detecting unit that detects a communication error in a display data channel (DDC);
an error information generating unit that generates error information indicating that the communication error occurred in the DDC if the communication error in the DDC is detected by the error detecting unit;
an extended display identification data (EDID) obtaining unit that obtains EDID from the display device;
a first code generating unit that generates a first error code if the communication error in the DDC is detected by the error detecting unit while the EDID obtaining unit is obtaining the EDID;
an HDCP process unit that performs a high-bandwidth digital content protection (HDCP) process with the display device;
a second code generating unit that generates a second error code if the communication error in the DDC is detected by the error detecting unit while the HDCP process unit is performing the HDCP process;
an error information output unit that delivers the error information, the first error code generated by the first code generating unit and the second error code generated by the second code generating unit via a transition minimized differential signaling (TMDS) channel;
a screen generating unit that generates, for each error code generated by at least one of the first code generating unit and the second code generating unit, error screen information corresponding to the each error code; and
an error display control unit that delivers the error screen information generated by the screen generating unit for the display device to display via the TMDS channel, wherein
the first code generating unit detects whether or not the DDC is fixed to a low level, and generates a predetermined first error code if the DDC is fixed to the low level,
the first code generating unit detects whether or not the display device has returned acknowledge (ACK) information via the DDC, and generates a predetermined first error code if the ACK information is not returned, and
the first code generating unit further decides whether or not a check sum of the EDID obtained by the EDID obtaining unit from the display device is correct, and generates a predetermined first error code if the check sum is not correct, and
the second code generating unit decides whether or not key selection vector (KSV) information obtained from the display device is correct, and generates a predetermined second error code if the KSV information is not correct,
the second code generating unit decides whether or not session key information obtained from the display device is correct, and generates a predetermined second error code if the session key information is not correct, and
the second code generating unit further decides whether or not HDCP BlkCipher information obtained from the display device is correct, and generates a predetermined second error code if the HDCP BlkCipher information is not correct.

* * * * *